Aug. 31, 1965
G. E. MALLINCKRODT
3,203,211
TUBING FABRICATION
Filed May 22, 1961
3 Sheets-Sheet 1
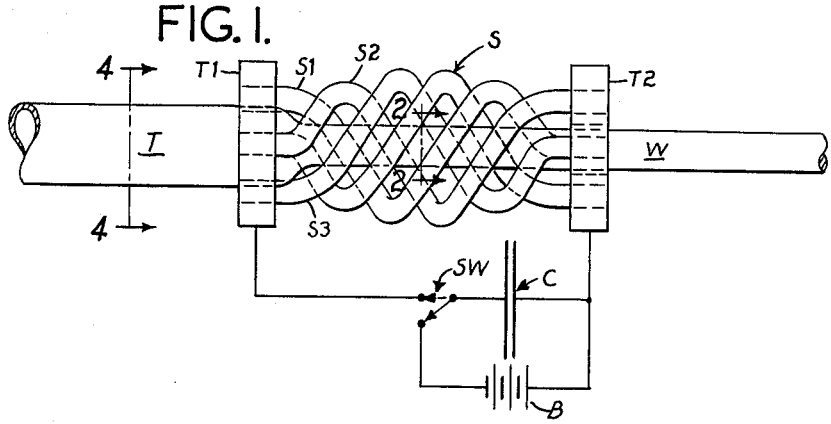
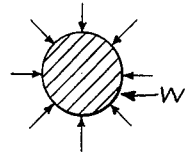
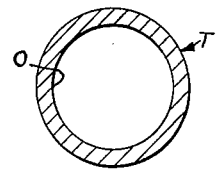
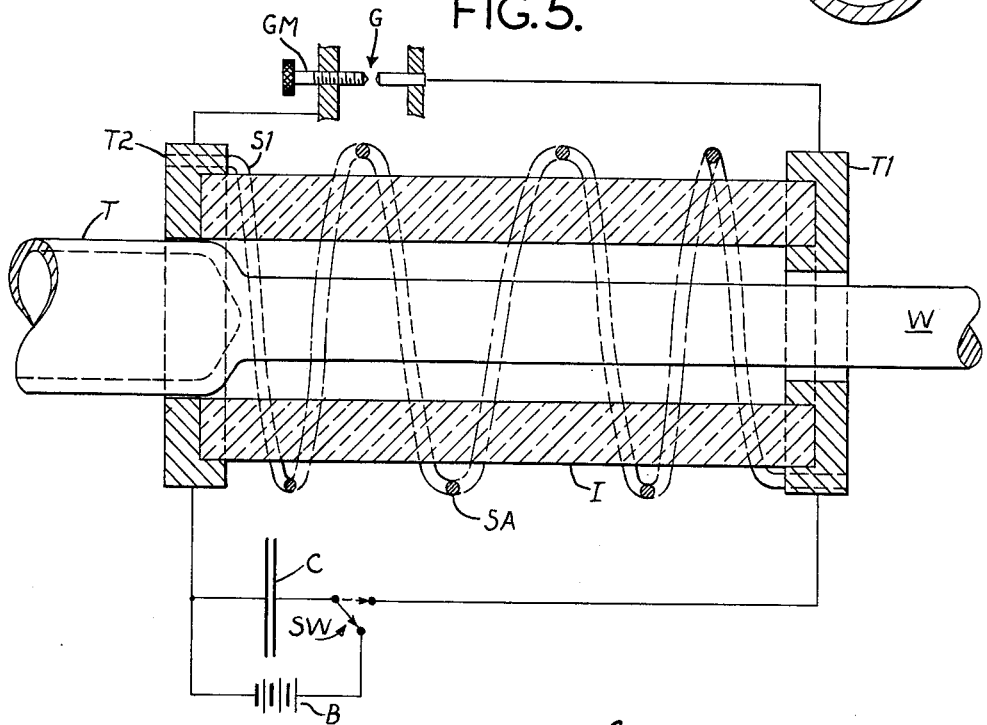
George E. Mallinckrodt,
Inventor.
Koenig, Pope, Senniger and Powers,
Attorneys.

Aug. 31, 1965  G. E. MALLINCKRODT  3,203,211
TUBING FABRICATION
Filed May 22, 1961  3 Sheets-Sheet 2
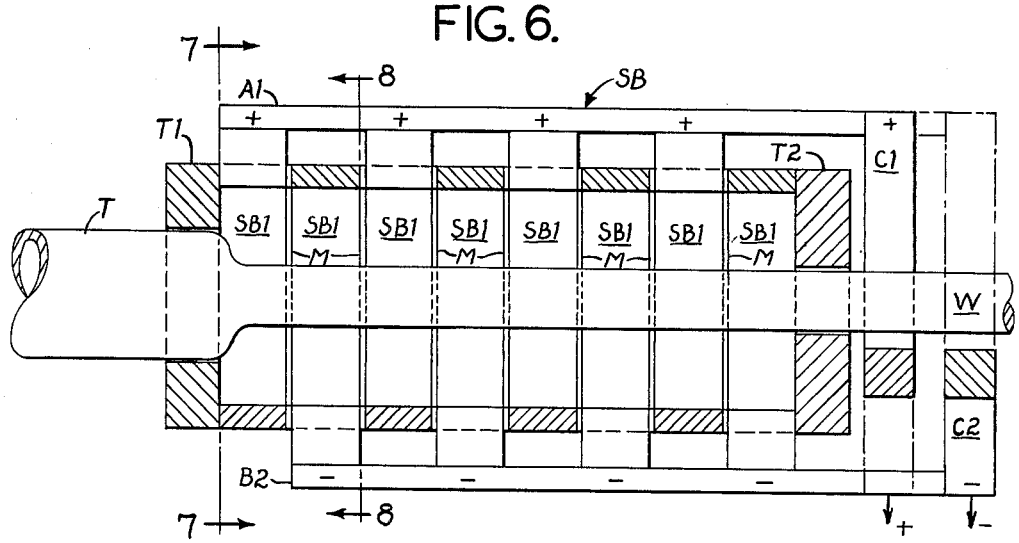
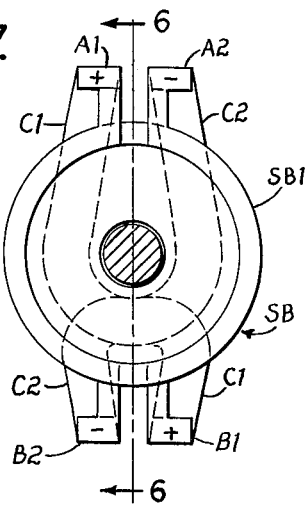
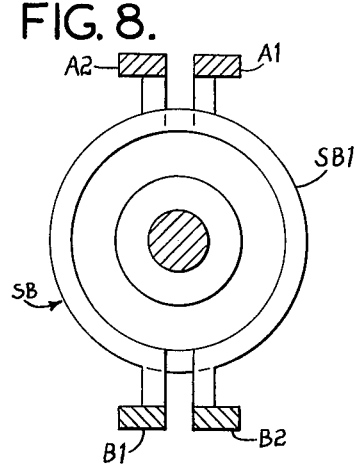

Aug. 31, 1965   G. E. MALLINCKRODT   3,203,211
TUBING FABRICATION
Filed May 22, 1961   3 Sheets-Sheet 3

United States Patent Office 3,203,211
Patented Aug. 31, 1965

3,203,211
TUBING FABRICATION
George E. Mallinckrodt, 20 Kingsbury Place,
St. Louis 12, Mo.
Filed May 22, 1961, Ser. No. 111,696
17 Claims. (Cl. 72—56)

This invention relates to tubing fabrication, and more particularly to methods and apparatus for fabricating metallic tubing from elongate rod or wire.

Among the several objects of the invention may be noted the provisions of methods and apparatus for fabricating tubing in which electrically and electromagnetically induced and applied fields are employed to convert solid metallic wire and rod into tubing; the provision of such methods which are essentially cold-flow processes and in which the physical characteristics of the finished tubing can be varied; and the provision of methods and apparatus which will continuously form tubing from solid metallic wire and rod. Other objects and features will be in part apparent and in part pointed out hereinafter.

The invention accordingly comprises the constructions and methods hereinafter described, the scope of the invention being indicated in the following claims.

In the accompanying drawings, in which several of various possible embodiments of the invention are illustrated, FIG. 1 illustrates diagrammatically one embodiment of tubing fabrication apparatus of the present invention;

FIG. 2 is a cross section on an enlarged scale of an elongate metal rod taken on line 2—2 of FIG. 1;

FIG. 3 is a cross section on an enlarged scale of the rod similar to that shown in FIG. 2 but after compression by an electromagnetic field;

FIG. 4 is a cross section on an enlarged scale of the elongate rod taken on line 4—4 of FIG. 1 with a central longitudinal opening;

FIG. 5 illustrates a second embodiment of apparatus of the present invention;

FIG. 6 is a longitudinal cross section of a solenoidal inductor component employed in apparatus of this invention taken on line 6—6 of FIG. 7;

Figure 9:
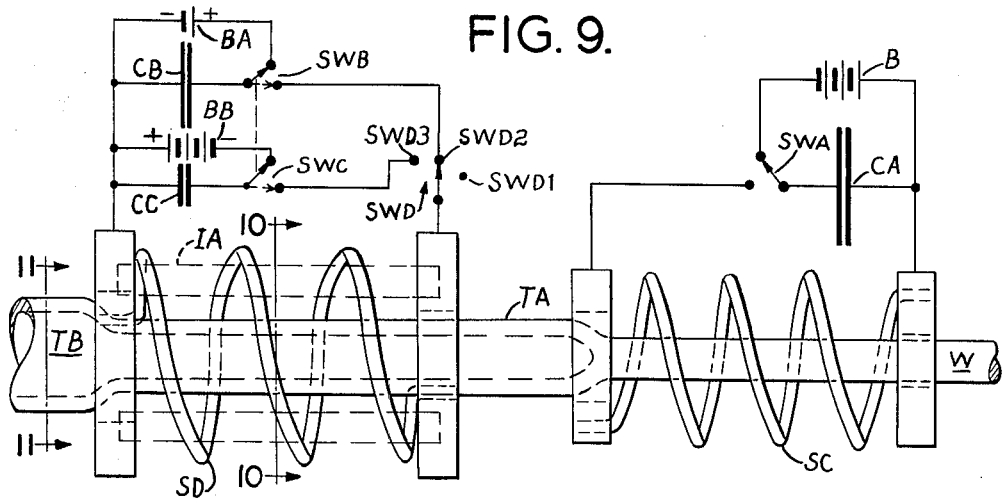
Figure 10:
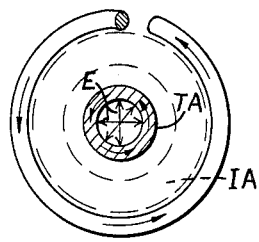
Figure 11:
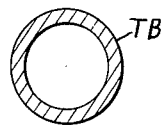
Figure 12:
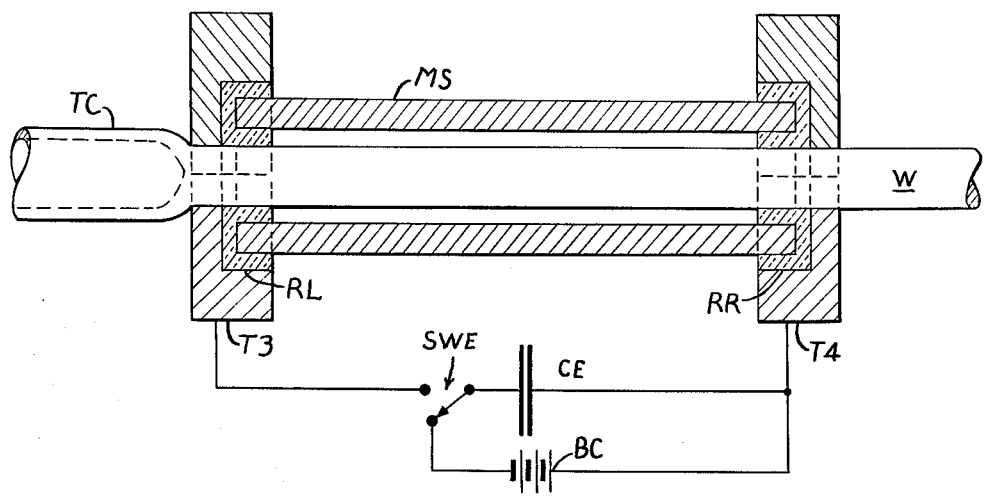

FIGS. 7 and 8 are cross sections taken on lines 7—7 and 8—8 respectively of FIG. 6;

FIG. 9 illustrates another embodiment of this invention;

FIG. 10 is a cross section taken on line 10—10 of FIG. 9 and on an enlarged scale of an elongate rod during a second process step;

FIG. 11 is a cross section taken on line 11—11 of FIG. 9 and on an enlarged scale illustrating a typical form of tubing fabricated in accordance with this invention; and FIG. 12 illustrates still another embodiment of this invention.

Corresponding reference characters indicate corresponding parts throughout the several views of the drawings.

In the manufacture of metallic tubing, it has been customary to form the tubing from solid stock by mechanical means such as die-extruding or by rolling an elongate metallic ribbon or strip into tubular form and electrically or mechanically welding the edges to form a longitudinal seam. Such fabrication techniques have certain disadvantages such as the undesirable characteristics of the finished tubing products which frequently accrue as the result of the substantial mass physical heating involved in such processes, and the complex, heavy and expensive mechanical apparatus needed to extrude and otherwise form tubing from solid stock.

In accordance with the present invention, tubing fabrication methods and apparatus are provided which essentially involve only a cold-flow process, and the conversion of solid metallic rod, wire, etc. into metallic tubing is accomplished simply and continuously, if desired, by electrically or electromagnetically induced fields.

Referring now more particularly to FIGS. 1–4 of the drawings, a solenoidal inductor is indicated generally at reference character S. This inductor is constituted by several helices S1, S2 and S3 of heavy electrically conductive metal connected in parallel at their opposite ends by heavy ring terminals T1 and T2. Each of the inductor conductors is wound about a central longitudinal axis of the solenoid and the helices are preferably symmetrically spaced one from the other at equal peripheral angles, e.g., 120° in the case of three helical conductors. The cross section of the conductors may be circular as shown or quadrilateral-shaped such as trapezoidal, if desired, and may be hollow to provide a passage for coolant. The diameter of inductor S is centrally expanded so that the inner diameters of the opposite solenoid ends are less than the solenoid's diameter at a point intermediate its ends. An elongate metal rod or wire, indicated generally at reference character W, is movable concentrically through the longitudinal central opening of the air core solenoid S. Connected between terminals T1 and T2 by means of one contact and the switch arm of a double-throw single-pole switch SW is a capacitor C. A source of electrical power, illustrated exemplarily as a battery B, is adapted to charge capacitor C through the other contact and the switch arm of switch SW.

Operation is as follows: Assuming the rod W is positioned as shown in FIG. 1 and the capacitor C is amply charged by battery B, movement of the arm of switch SW to the dashed-line position will discharge capacitor C through solenoidal inductor S to generate a transient electromagnetic field or pulse of very short time duration with a rapid rise time. As this magnetic field is of such a brief duration there is very little current penetration into the surface of the rod. In effect, a magnetic shield is formed by the skin effect, i.e., the currents traversing the outer surface or skin of the rod W. The net effect of the suddenly applied strong transient magnetic field is to apply large compressive forces to the outer surfaces of the rod as illustrated in FIG. 2. As a result of these suddenly applied compressive forces, great internal stresses are set up within the rod as shown in its momentarily compressed state in FIG. 3. The reaction of inductive magnetic pressure on the solenoid is stabilized by the mutual attraction of the turns thereof as well as by their inertia. This inductive magnetic pressure or compressive force is great enough to instantaneously increase the density of the rod to values in the order of 1.1 to 1.5 or more times normal density with a concomitant decrease in cross-sectional volume. The resultant momentary magnetic squeeze causes shock waves to impinge symmetrically and radially inwardly to converge on the longitudinal central axis of the rod and effect a high, very localized temperature multiplication and energy release in the nature of an explosion. The resultant internal stresses are released by expansion outwardly or radially of the rod and will form a central fissure or longitudinal central axial opening O in the rod as indicated in FIG. 4. Thus the expanded rod with the central opening which results from this transient application of the solenoid's magnetic field constitutes a length of metallic tubing as indicated at T. The transitory nature of the application of energy to effect this physical transformation prevents the mass temperature from increasing to levels where undesirable thermallyinduced changes in the metal result. Thus this is essentially a cold-flow process, i.e., the mass temperature does not reach the melting point of the rod or wire. Moreover the methods and apparatus of the present invention are applicable to metals and alloys that could not be worked satisfactorily by known methods because of the high mass temperatures required during mechanical working. The rod may be mechanically advanced to the left as indicated in FIG. 1 to form a continuous length of tubing T by intermittently charging capacitor C from power source B and discharging it through solenoidal inductor S sequentially.

The various parameters of the components, time constant and discharge time durations are of course a function of the dimensions of the elongate rod W and its particular metallic composition. For example, if it is desired to fabricate copper tubing ⅛" to ³⁄₁₆" outside diameter from an elongate rod such as 10-gauge copper wire, the electrical energy discharged through inductor S should be in the order of $10^4$ or $10^5$ joules, while heavier stock material or stainless steel stock would require additional energy to be discharged through inductor S, say in the order of $10^6$ joules or more. The discharge time may be in the order of from less than one microsecond to ten or more microseconds, while the capacitive parameters of the capacitor, or bank of capacitors, C would be 10 mfd. to 1 f. Similarly, the D.C. power source potential used to charge capacitor C would range from perhaps 50 to 200,000 volts. If the wire W is to be converted into tubing such as that used for hypodermic needles, parameters closer to the lower exemplary values noted would be utilized.

The physical characteristics of the tubing may be varied considerably by adjustment of the physical and electrical parameters of the apparatus. For example, the nature of the tubing wall may be varied from a dense and compact character to a porous, stratified or honeycomb nature by variation of the energy level and time constants. If the energy of the discharge is reduced below values which will produce a compact dense wall structure within well-controlled thickness limits, a porous, stratified honeycomb material will result, such as is useful in the fabrication of oil impregnated bearings. This is due to differential density and velocity gradients that exist in the rod or wire as it undergoes magnetostrictive compression and expansion. That is, the outer portions of the rod move inwardly and outwardly at a greater velocity than that of portions which are located closer to the central axis of the rod, and if the explosive forces and vapor formed and generated along the axis are of reduced magnitude, the sudden return of the outer portions of the wire from the compressed state of FIG. 3 will tend to pull apart and form voids in the metal as its portions move radially outward at different velocities. The energy level may be adjusted in many ways apparent to those skilled in the art, such as by varying the time constant. Thus by adjustment and control of these parameters the physical characteristics of the expanded rod or wire can be varied considerably.

It will be understood that any customary power source, such as a generator or rectifier type voltage multiplication apparatus, may be utilized at B to charge capacitor C and that an electronic type switch, such as an ignitron, would be the full equivalent of switch SW. The solenoid inductor may also be of a constant diameter instead of centrally enlarged, as shown, but the latter shape is useful to effect a magnetic holding or restraint at the ends of the rod W at the opposite ends of the inductor, thereby inhibiting any tendency for the rod to lengthen somewhat to relieve the internal stresses rather than simply to expand radially outwardly.

A second embodiment of this invention is illustrated in FIG. 5. The apparatus and method exemplified by this drawing are similar to those described above, except in three respects: First, the diameter of the solenoid indicated at SA is not increased centrally but the pitch of the helix (single rather than multiple in this instance) is increased at each end to shape the magnetic field to effect a magnetic retention to inhibit any elongation of the section of rod within inductor S1 in partial relief of the internal stresses induced by the transient magnetic field. Second, an insulating sleeve I is shown positioned centrally and longitudinally within the opening of SA. This sleeve (which may be formed of glass, or fused ceramic, or synthetic resins, preferably reinforced) functions to restrain or limit the outward expansion of the rod W under the effect of the internal stresses, and to assure a completely symmetrical shape and wall thickness of the tubing thus formed. The sleeve may be of the split type and therefore openable if desired. However, the cushioning effect of the atmosphere and the small "bounce-back" of the tubing from the inner surface of the sleeve I usually permits free passage of the tubing through sleeve I as the outer diameter of tubing T usually is, therefore, somewhat less than the inner periphery dimensions of I because of this effect. Third, a novel control feature, as indicated at G, is incorporated in this apparatus.

In the previous embodiment, substantially all of the energy of the capacitor or capacitor bank was dissipated through the inductive coil S. Thus the portion of the capacitor's energy normally expanded in the damping terminal oscillation or hunting in an L-C-R circuit was dissipated substantially usefully in the previously described method and apparatus. In the FIG. 5 embodiment, control G comprises an adjustable spark gap with a micrometer adjustment GM. The gap may be enclosed in a gas-filled or evacuated tube and adjusted so that it will arc over or fire when the potential across terminals T1 and T2 exceeds a predetermined level. A varistor, such as sold under the trade designation "Thyrite," and other equivalent voltage control devices are operable to limit the rise of voltage across T1 and T2. By varying the gap of G by manual adjustment of GM, close control of the magnitude of energy release can be conveniently obtained. Thus only the energy in a selected initial portion of the rise cycle of the L-C-R circuit may be utilized.

In the above-described two embodiments, a multisolenoidal inductor S and a variable-pitch solenoidal inductor SA were illustrated. Another form of inductor useful in the present invention is shown in FIGS. 6–8, and indicated generally at reference character SB. This inductor SB is constituted by a concentric assembly of identical metallic split-ring or horse-shoe shaped segments SB1 separated by their circular spacers of insulation material M, such as mica. Alternate split-ring segments are inverted so that the openings or gaps of adjacent rings face in diametrically opposite directions. The ends of the split-ring segments SB1 which open upwardly are commonly respectively parallel-connected to two bus-bar type conductors A1 and A2, which for convenience have exemplary polarities indicated thereon. Similarly, the opposing ends of the downwardly opening split-ring segments SB1 are respectively parallel-connected by two additional bus-bar type conductors B1 and B2. With the arbitrary polarities respectively indicated at B1, B2 and A1, A2, current will flow through all segments SB1 in the same direction, i.e., clockwise in FIG. 7, following the electron flow convention. A cross-connecting conductor C1 interconnecting A1 and B1 for common connection to one terminal of a generator or capacitor bank is shown in FIGS. 6 and 7. A second cross-connecting conductor C2 interconnecting A2 and B2 is similarly shown, so that the other terminal of the capacitor bank may be commonly connected to the proper end terminals of each segment SB1.

The inductor structure of FIGS. 6–8 may be used as an alternate inductor in the apparatus and methods of FIGS. 1–5 and thus provides an additional means for varying the ampere turns, impedance, and time constants of these embodiments, thereby to handle different dimensions or metal alloys or effect different expansions of the metal rods or wires W and to effect different physical characteristics in the finished tubing T. Other inductor configurations such as a single turn inductor constituted by a split metallic sleeve may be used in the practice of this invention. In order to insure maximum radial and axial symmetry of the inductive field the interturn spacing is made small relative to the radial spacing between the rod and the inner periphery of the inductor.

In the previous embodiments, the conversion of the wire or rod W into tubing constituted by an expanded rod with a longitudinal central opening was accomplished in a single step. In the embodiment illustrated in FIG. 9, a multiple-step process is employed to fabricate tubing from rod. The first step is performed by the portion of the apparatus on the right of the FIG. 9 illustration referenced at B, CA, SC and SWA. It operates as described above in regard to the embodiments illustrated in FIGS. 1–8. Thus, rod W is formed into tubing TA by the operation of that portion of the apparatus. A further enlarging of the outer and inner diameter of tubing TA to increased dimensions as exemplified by tubing TB is performed by a second solenoid inductor SD, two capacitors or capacitor banks CB and CC, two power sources BA and BB and three switches SWB, SWC and SWD. It is preferred that the D.C. potential of BB be substantially greater than that of BA and that the capacitance of CB be substantially greater than that of CC. The power sources BA and BB are respectively connected to charge capacitors CB and CC by movement of ganged switches SWB and SWC from the solid-line position to the dashed-line position. The three-position switch SWD has three contacts SWD1, SWD2 and SWD3, its switch arm being connected to one terminal of SD. An optional insulation sleeve IA is shown in dashed lines.

Operation of this portion of the FIG. 9 apparatus is as follows: After capacitors CB and CC have been fully charged, switches SWB and SWC are moved to their dashed-line position and the arm of switch SWD is moved from its deenergized position over contact SWD1 to its second position connecting the positive terminal of capacitor CB to the right end of solenoid inductor SD via contact SWD2. As the capacitance of CB is larger than that of CC and its charged potential is somewhat less, a current of somewhat lesser magnitude and longer duration is discharged through SD. The magnetic pressure or force exerted is not sufficient to collapse the walls of TA, but the duration is made sufficiently long that current penetration is effected to the inner periphery of tubing TA. Again, as previously there is no substantial mass heating of the tubing TA by the relatively slow (as compared to the more rapid rise transient magnetic fields described above in regard to FIGS. 1–5 and the right-end or first-step method of this FIG. 9 embodiment) rise time magnetic pulse. Switch SWD is then moved to its position connecting the negative terminal of CC to the inductor SD via contact SWD. As CC is of lower capacitance and BB of higher potential than CB and BA, respectively, a rapid rise time magnetic pulse is generated by current coursing through SD in a direction opposite to the current flow effected by discharge of CB through SD. The magnetic field outside of tubing TA is instantaneously reduced to zero by the current reversal and the circulating currents around the inner periphery of TA (both currents being indicated in FIG. 10) effect substantial expansive forces inside the tubing TA, as indicated by the arrows E, which expand TA outwardly radially to an enlarged inner and outer diameter tubing as indicated at TB.

As indicated at IA, an insulating sleeve may be optionally used in FIG. 9 to control the expansion to closer tolerances. It will be understood that other means for electrically generating internal forces E, such as generators, inductors and batteries and other components which will be apparent to those skilled in the art, may be used rather than the double-capacitor discharge apparatus illustrated in the left portion of FIG. 9.

In the preceding embodiments, the high-level magneto-compressive forces that were momentarily applied to the rod or wire W were induced in W by means of the transient field electromagnetically generated by an inductor. In the FIG. 12 embodiment, sudden magnetostrictive forces are applied without the use of an inductor such as S, SA, etc. Heavy metallic collet-type terminals T3 and T4 are employed to firmly and conductively clamp spaced-apart portions of a section of rod or wire W. Each of these collet terminals has an inner insulated annular recess (RL and RR, respectively). The opposite ends of a heavy split metallic sleeve MS are secured in these recesses. The terminals T3 and T4 are connected by means of a switch SWE to opposite terminals of a capacitor CE adapted to be charged by a power source BC via the other contact of SWE.

Operation of this FIG. 12 embodiment is similar to that described above except that the capacitor CE is discharged directly through the rod W to effect the momentary application of large compressive forces by magnetostrictive effects. Also, the restraining sleeve MS may be metal as noted because the magnetic forces to W are not applied inductively by the field of an inductor as was the case in the previous embodiments. The rapid energy transfer and concentration along the axial center line of rod W thereby follows to axially fissure the rod explosively by the vapor formed, and the rod W thereafter expands axially outward to form tube TC, the outer diameter being substantially equal to the inside diameter of MS. In this FIG. 12 apparatus and method, the collet terminals and split sleeve MS are opened sufficiently after each capacitor discharge so as to permit intermittent advance of rod W and effect the formation of a series of tubing sections separated by small lengths of solid wire or rod.

In view of the above, it will be seen that the several objects of the invention are achieved and other advantageous results obtained.

As various changes could be made in the above constructions and methods without departing from the scope of the invention, it is intended that all matter contained in the above description or shown in the accompanying drawings shall be interpreted as illustrative and not in a limiting sense.

I claim:

1. A method for fabricating metallic tubing from an elongate metal rod comprising momentarily applying large compressive forces to the outer surfaces of said rod by means of a transient electromagnetic field to cause shock waves to converge symmetrically and radially inwardly on the longitudinal central axis of said rod thereby to effect a high localized temperature multiplication at said central axis, and permitting said rod to expand outwardly in response to the internal stresses thus engendered in said rod thereby to form a longitudinal central axial opening in the rod.

2. A method as set forth in claim 1 which further includes the step of limiting the outward expansion of said rod by restraining the expansion beyond a predetermined limit.

3. A method for fabricating metallic tubing from an elongate metal rod comprising momentarily applying large compressive forces to the outer surfaces of said rod by means of a transient first electromagnetic field to cause shock waves to converge symmetrically and radially inwardly on the longitudinal central axis of said rod thereby to effect a high localized temperature multiplication at said central axis, permitting said rod to expand outwardly in response to the internal stresses thus engendered in said rod thereby to form a longitudinal central axial opening in the rod, and thereafter applying large expansive forces to the inner surfaces of said central axial opening of the rod by means of a transient second electromagnetic field to further increase the dimensions to said axial opening.

4. A method as set forth in claim 3 which further includes the step of limiting the outward expansion of said rod by physically restraining the outward expansion beyond a predetermined limit.

5. Apparatus for fabricating metallic tubing from an elongate metal rod comprising a solenoidal inductor having a longitudinal axial opening adapted to receive an elongate metal rod, a source of D.C. electrical power including a capacitor, electrical means including a switching device for discharging electrical power stored in said capacitor through said inductor transiently to energize said inductor to generate an electromagnetic field to apply strong compressive forces to the outer surfaces of said rod to effect a sudden increase in density and decrease in the cross-sectional area of said rod whereby after said transient energization the rod suddenly expands outwardly in response to the internal stresses thus engendered in said rod thereby to form a longitudinal central axial opening in said rod, and a hollow sleeve of insulating material coaxially mounted within the longitudinal axial opening of said inductor and having an inside diameter greater than the outside diameter of the elongate metal rod before expansion whereby the outward expansion of said rod is limited.

6. Apparatus as set forth in claim 5 in which said solenoidal inductor comprises conductors connected in parallel and which are in the form of a plurality of helices looped around a substantially common axis.

7. Apparatus as set forth in claim 6 in which the inner diameters of the opposite ends of said solenoid are less than the inner diameter of the solenoid at a point intermediate its ends.

8. Apparatus as set forth in claim 6 in which the pitches of the helices are varied along the length of said inductor, the pitch of the helices adjacent each end of the inductor being less than the pitch at a point intermediate its ends.

9. Apparatus as set forth in claim 5 in which said solenoidal inductor comprises a plurality of axially aligned spaced-apart split ring segments all electrically connected in parallel.

10. Apparatus as set forth in claim 9 in which adjacent segments have diametrically opposed openings.

11. Apparatus as set forth in claim 5 which further includes a voltage limiting device shunt-connected across the inductor whereby an increase in the electrical potential across the inductor is limited to a predetermined value.

12. Apparatus as set forth in claim 11 in which said voltage limiting device is adjustable and the energy applied to said rod may be controlled thereby to vary the physical characteristics of the metallic tubing formed.

13. Apparatus as set forth in claim 5 in which the inductor includes conductors which are quadrilateral in cross section.

14. Apparatus for fabricating metallic tubing from an elongate metal rod comprising a pair of electrical terminals each having an aperture adapted to receive and conductively clamp therein a section of said metal rod, said apertured terminals being spaced apart and axially aligned, a sleeve having a length at least equal to the spacing between said terminals and coaxial with said apertures and having an inside diameter substantially equal to the outer diameter of the tubing to be formed, a source of D.C. electrical power including a capacitor, and electrical means including a switching device for transiently connecting said capacitor across said terminals to discharge the electrical power stored in said capacitor to apply an electrical potential across said terminals and thus generate an electromagnetic field to apply strong compressive forces to the outer surfaces of said rod to effect a sudden increase in density and decrease in the cross-sectional area of said rod, whereby after said transient energization the rod suddenly expands outwardly in response to the internal stresses thus engendered in said rod thereby to form a longitudinal central axial opening in said rod and whereby the outward expansion of said rod is limited by said sleeve.

15. A method of fabricating metallic tubing from an elongate metal rod comprising charging a capacitor to a high voltage, rapidly discharging said capacitor through said rod to effect momentary application of compressive forces on the central longitudinal axial portion of said rod to vaporize said portion thereby to axially fissure said rod by the vapor formed, permitting said rod to expand outwardly in response to the internal stresses thus engendered, and limiting the outward expansion of said rod by physically restraining the expansion thereof beyond a predetermined limit.

16. Apparatus for fabricating metallic tubing from an elongate metal rod comprising a solenoid having a longitudinal axial opening adapted to receive an elongate metal rod, the inner diameter of the opposite ends of said solenoid being less than the inner diameter of said solenoid at a point intermediate its ends, a source of D.C. electrical power including a capacitor, and electrical means including a switching device for discharging electrical power stored in said capacitor through said solenoid transiently to energize said inductor to generate an electromagnetic field to apply strong compressive forces to the outer surfaces of said rod to effect a sudden increase in density and decrease in the cross-sectional area of said rod whereby after said transient energization the rod suddenly expands outwardly in response to the internal stresses thus engendered in said rod thereby to form a longitudinal central axial opening in said rod.

17. Apparatus for fabricating metallic tubing from an elongate metal rod comprising a solenoid having a longitudinal axial opening adapted to receive an elongate metal rod, said solenoid comprising a conductor in the form of a helix looped around said axial opening, the pitch of said helix being varied along the length of said solenoid, the pitch adjacent each end thereof being less than the pitch at a point intermediate its ends, a source of D.C. electrical power including a capacitor, and electrical means including a switching device for discharging electrical power stored in said capacitor through said solenoid transiently to energize said inductor to generate an electromagnetic field to apply strong compressive forces to the outer surfaces of said rod to effect a sudden increase in density and decrease in the cross-sectional area of said rod whereby after said transient energization the rod suddenly expands outwardly in response to the internal stresses thus engendered in said rod thereby to form a longitudinal central axial opening in said rod.

References Cited by the Examiner

UNITED STATES PATENTS

| | | | |
|---|---|---|---|
| 2,225,424 | 12/40 | Schwarzkopf | 219—149 X |
| 2,577,899 | 12/51 | Linton | 29—155.5 X |
| 2,662,161 | 12/53 | Dreyfus | 13—26 X |
| 2,664,496 | 12/53 | Brace | 13—26 X |
| 2,976,907 | 3/61 | Harvey et al. | |

OTHER REFERENCES

Langlois, A.P.: "Electromagnetic Metal Forming-High Energy Exerts Shaping Force," The Tool and Manufacturing Engineer, May 1961, pp. 105–108.

WHITMORE A. WILTZ, *Primary Examiner.*

HYLAND BIZOT, *Examiner.*